United States Patent [19]

Jacobson

[11] Patent Number: 4,865,401

[45] Date of Patent: * Sep. 12, 1989

[54] GLOVE BAG WASTE REMOVAL SYSTEM FOR ASBESTOS IMPREGNATED BRAKES

[76] Inventor: Earl B. Jacobson, 510 S. Shore Dr., Crystal Lake, Ill. 60014

[*] Notice: The portion of the term of this patent subsequent to Apr. 11, 2006 has been disclaimed.

[21] Appl. No.: 187,301

[22] Filed: Apr. 28, 1988

Related U.S. Application Data

[63] Continuation-in-part of Ser. No. 1,075, Jan. 7, 1987, Pat. No. 4,820,000.

[51] Int. Cl.⁴ .............................................. A61G 11/00
[52] U.S. Cl. .......................................... 312/1; 15/345; 134/21; 312/3
[58] Field of Search ............. 312/1, 3, 5, 6, 283; 280/770; 224/42.42, 42.45 R, 42.46 R; 15/227, 345; 134/6, 10, 21, 42; 138/97

[56] References Cited

U.S. PATENT DOCUMENTS

| | | | |
|---|---|---|---|
| 1,035,315 | 8/1912 | Burton | 312/6 |
| 2,786,740 | 3/1957 | Taylor et al. | 312/1 |
| 3,051,163 | 8/1962 | Trexler | 312/1 |
| 3,051,164 | 8/1962 | Trexler | 128/1 B X |
| 3,086,674 | 4/1963 | Scheuerman | 312/1 X |
| 3,222,707 | 12/1965 | Allenbaugh . | |
| 3,267,830 | 8/1966 | Van Gaasbeek | 312/1 X |
| 3,510,905 | 5/1970 | Bannert | 15/345 |
| 4,141,609 | 2/1979 | Eisert | 312/1 |
| 4,205,412 | 6/1980 | Weber . | |
| 4,327,760 | 5/1982 | Lancaster | 312/1 X |
| 4,331,254 | 5/1982 | Haggerty | 312/1 X |
| 4,373,547 | 2/1983 | Geis et al. | 312/1 X |
| 4,485,490 | 12/1984 | Akers et al. | 312/1 X |
| 4,505,190 | 3/1985 | Fink et al. | 138/97 X |
| 4,626,291 | 12/1986 | Natale | 312/3 X |
| 4,643,471 | 2/1987 | Fishback | 280/770 X |
| 4,712,270 | 12/1987 | Palmer . | |

FOREIGN PATENT DOCUMENTS

| | | | |
|---|---|---|---|
| 2643067 | 3/1978 | Fed. Rep. of Germany | 15/345 |
| 2936779 | 4/1981 | Fed. Rep. of Germany | 15/345 |
| 3004066 | 8/1981 | Fed. Rep. of Germany | 312/1 |
| 765635 | 6/1934 | France | 312/1 |
| 2346061 | 10/1977 | France | 15/345 |
| WO8605431 | 9/1986 | PCT Int'l Appl. | 312/1 |

OTHER PUBLICATIONS

Hako Minuteman, Asbestos Brake Drum Vacuum System, pp. 1-4.
Nilfisk, Nilfisk Asbesto-Clene System, pp. 1-4.
Pro/Control Products, Encapsulator, 1987, pp. 1-4.

Primary Examiner—James T. McCall
Assistant Examiner—Thomas A. Rendos
Attorney, Agent, or Firm—Silverman, Cass, Singer & Winburn, Ltd.

[57] ABSTRACT

An improved lightweight, collapsible preferably PVC formed glove bag asbestos brake removal/confinement system. The bag includes removable stiffening ribs and a replaceable flexible dual membrane opening in one end to mount the bag over the brake assembly. The bag is supported from a surface underneath by an adjustable telescoping pole. The bottom of the bag includes an access zipper for removing or placing tools or the brakes in the bag. The bag optionally includes a removable bottom protective panel to prevent penetration of the bag by tools or brakes dropped thereon. The interior of the bag can be accessed from either side or from the front thereof and is tapered or shaped as desired for easy access to the brake assembly work area.

21 Claims, 2 Drawing Sheets

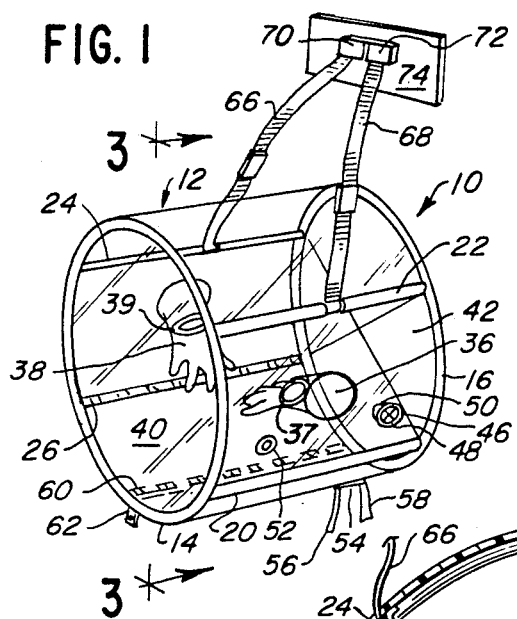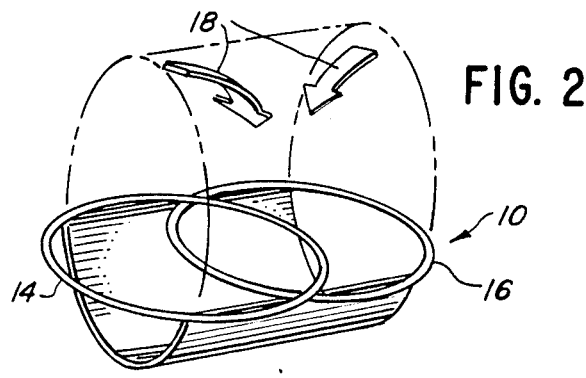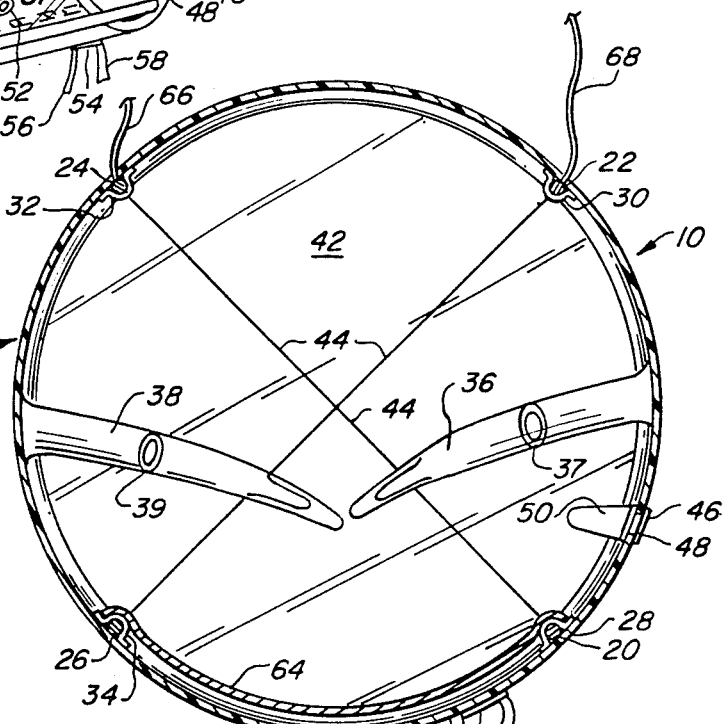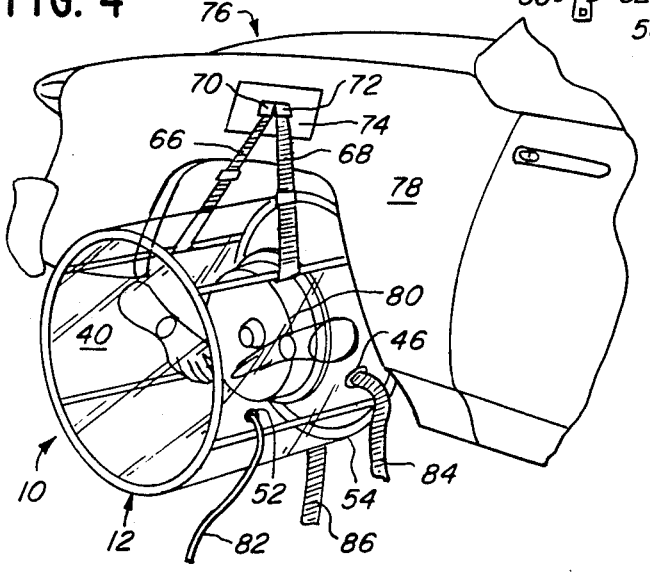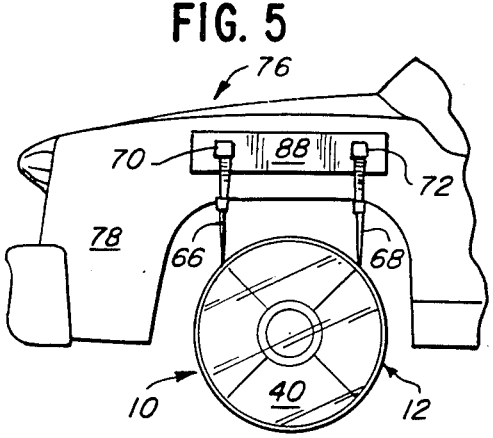

GLOVE BAG WASTE REMOVAL SYSTEM FOR ASBESTOS IMPREGNATED BRAKES

CROSS REFERENCE TO RELATED APPLICATION

This application is a continuation-in-part of Ser. No. 001,075, filed Jan. 7, 1987, U.S. Pat. No. 4,820,000, the disclosure of which is incorporated herein by reference.

BACKGROUND OF THE INVENTION

The invention relates generally to hazardous waste removal systems and more particularly to an improved glove bag removal system for removing asbestos impregnated brakes in a defined area.

Numerous prior art glove bag waste removal systems have been utilized for a considerable period of time for removing waste from a closely defined work area in which the contaminated or hazardous wastes are confined. The worker is protected from the wastes since the wastes are confined inside of the system and the worker works in the system but avoids direct contact with the wastes by utilizing the well known glove bag concept.

One particular application for glove bag waste removal is in removing or repairing asbestos impregnated brake drum assemblies. Asbestos fibers or particles are a proven hazardous waste and the free releasing of the fibers/particles into the air is a serious health hazard to workers and anyone else in the work area. OSHA & NIOSH therefor have issued strict standards for limiting the release of the fibers/particles to prevent exposing people to these hazardous wastes.

Several prior art waste removal protection systems have been proposed for cleaning, removing or working on asbestos impregnated brakes and other brake parts. One system utilizes a vinyl hood on a cylindrical metal wire cage suspended from a separate dolly stand. The hood is substantially clear for visibility of the worker and has a built-in air nozzle for dislodging the asbestos waste. A second type of system utilizes a rigid cylinder with one or more viewing windows which can be mounted on a low type jack or a hydraulic lift. The cylinder also has built-in compressed air guns with quick connect couplings and one to three cotton sleeves for access to the inside of the cylinder. Both systems are adapted to be connected to a negative pressure or vacuum filter system which maintains the system under negative pressure to sweep out any dislodged asbestos waste.

Such systems although viable, present a number of disadvantages for the user, especially users with a number of brake removal stations. The systems and their attendant stands are expensive and very cumbersome to move around and/or to share between workers.

Another somewhat related glove bag waste removal system and application is disclosed in application Ser. No. 001,074, entitled "Hazardous Waste Glove Bag Removal System", filed on Jan. 7, 1987, the disclosure of which is incorporated herein by reference.

SUMMARY OF THE INVENTION

The above and other disadvantages of prior art asbestos brake removal/confinement systems and techniques are overcome in accordance with the present invention by providing a lightweight, collapsible glove bag waste removal system which easily is mounted onto and removed from brake assemblies while protecting the worker from release of the hazardous asbestos waste fibers/particles.

The glove bag preferably is formed from optically clear, flexible PVC material with removable stiffening ribs. The bag can be supported by a telescoping pole resting on the floor which allows the bag essentially to float sealingly around the brake assembly, while maintaining lateral stability.

The bag includes one or more glove sleeves and access for one or more compressed air hoses and/or tools. Access to the interior of the bag can be provided through the sides or through the front thereof and the bag can be larger on one end or the other to assist in providing access to the brake assembly. The bottom of the bag includes an access zipper for removing or placing the brakes or tools in the bag and optionally includes a removable bottom protective PVC or plastic panel to prevent penetration of the bag by tools or brakes dropped by the worker thereon. The bag includes a replaceable flexible dual membrane controlled opening in one end to mount the bag over the brake assembly.

BRIEF DESCRIPTION OF THE DRAWINGS

FIG. 1 is a perspective view of one embodiment of the asbestos brake removal/confinement system of the parent application;

FIG. 2 is a perspective functional diagram of the collapsibility of the system of FIG. 1;

FIG. 3 is an end sectional view of the system of FIG. 1 taken along the line 3—3 therein;

FIG. 4 is a perspective view of the system of FIG. 1 mounted on an automobile and the brake assembly thereof;

FIG. 5 an end view of a second mounting embodiment of the parent application mounted on the automobile and the brake assembly thereof;

DESCRIPTION OF THE PREFERRED EMBODIMENTS

Figures 6, 7, 8:
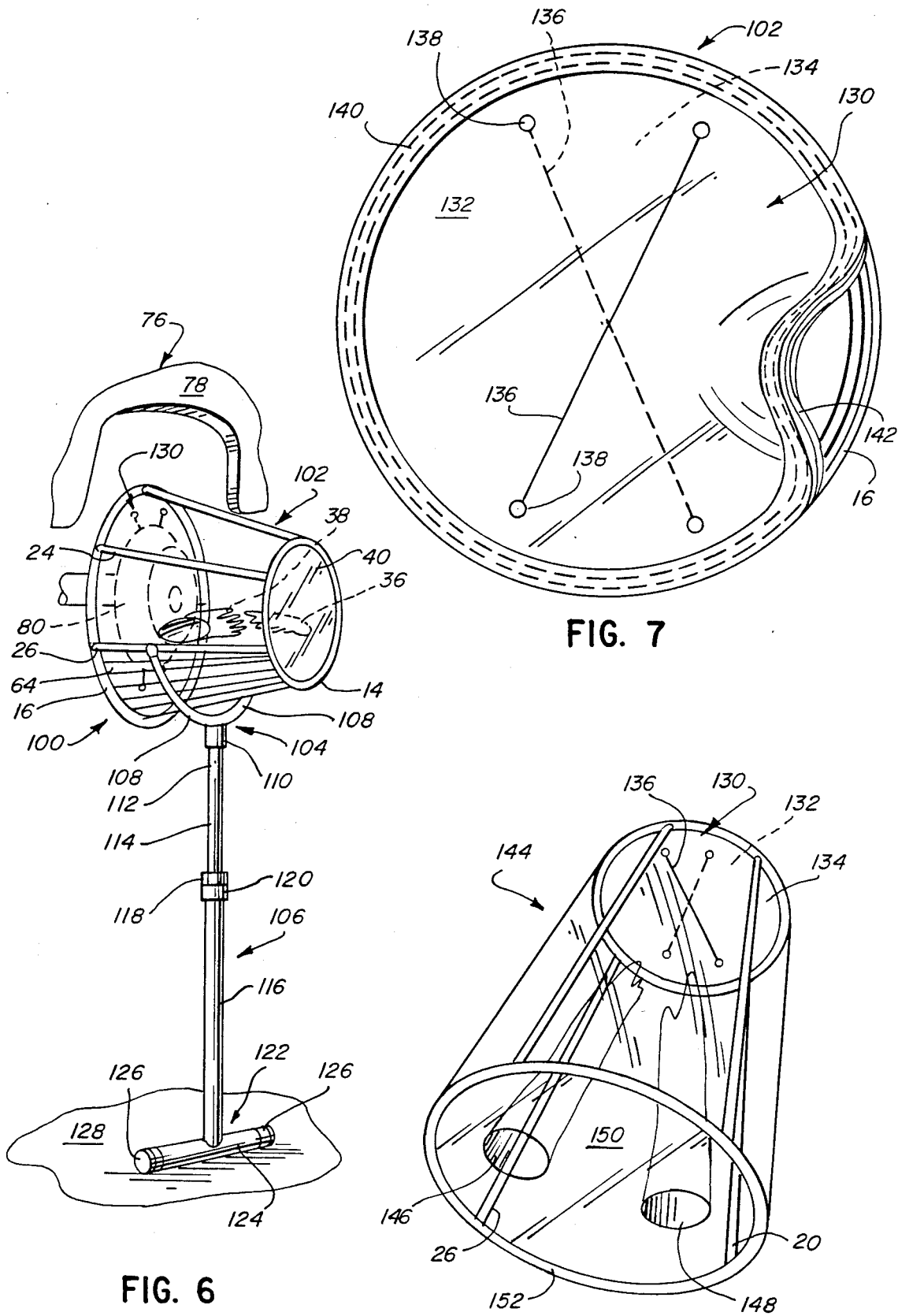
FIG. 6 is a perspective view of the system of the present invention mounted on an automobile and the brake assembly thereof.
FIG. 7 is an end elevational view of the system of FIG. 6, the end shown partly separated from the system to reveal the releasable attachment thereto.
FIG. 8 is a perspective view of an alternate embodiment of the invention depicting access into the interior of the system of the invention through the front thereof.

FIGS. 1-5 are illustrative of embodiments disclosed in parent application, U.S. Ser. No. 001,075.

Referring to FIGS. 1 and 3, one asbestos glove bag brake removal/confinement system of the parent application is designated generally by the reference character 10. The system 10 includes a confinement housing or bag 12, which preferably is formed from an optically clear flexible PVC material, to provide strength while allowing the worker good vision into the bag. The bag 12 has a pair of semirigid rings 14 and 16 sealed to or within the ends of the bag 12. The bag 12 can be formed from several pieces of PVC material and then electronically welded or heat sealed to form an integral non-leaking bag. The rings 14 and 16 preferably are tubes formed from semirigid PVC material and then are encased within the bag PVC material before sealing therein.

The bag 12 is generally collapsible as illustrated by arrows 18 in FIG. 2, for storage or shipping. However, the bag 12 is assembled by inserting a plurality of removable stiffening tubes or rods 20, 22, 24, and 26, which are inserted into respective sleeves 28, 30, 32, and 34 bonded to the bag 12.

The bag 12 includes at least one glove sleeve 36 in one side thereof for use by the worker to avoid contact with the asbestos waste. Preferably the bag 12 includes a second glove sleeve 38 in the opposite side thereof to allow the worker easily to manipulate the tools or brake assembly inside the bag 12. The glove sleeves 36 and 38 can include respective rigid cuffs 37 and 39, preferably made from plastic, PVC or metal materials. The cuffs 37 and 39 can be secured, welded or otherwise sealingly attached to the sleeves 36 and 38. This keeps the glove portions open for easy access and allows the glove portions to be separate replaceable parts. Also, the bag 12 could include at least a third glove sleeve in one end 40 of the bag 12, which would reach the length of the bag 12 (as illustrated in FIG. 8).

The opposite end of the bag 12 includes a flexible sealing membrane 42, which is inserted over the brake assembly when the bag 12 is mounted for use by the worker. The membrane 42 can have a plurality of cross slits 44 which allow the membrane 42 to be fitted over the brake assembly, much like a button/button hole assembly. The membrane 42 also can be replaced by other types of sealing means such as a bunge controlled opening, which opening also could be utilized in addition to the membrane 42.

The bag 12 further includes a plurality of access openings to provide various functions for the worker without allowing the waste to escape. A self-sealing penetration sleeve 46 is provided in one side of the bag 12, to provide access for a probe, such as an additional vacuum or compressed air probe. The sleeve 46 includes a self-sealing cross slit membrane 48, which along with an inner tube 50 ensures that the penetration of the sleeve 46 by a probe does not release waste. The details of the sleeve 46 are disclosed in co-pending application Ser. No. 001,074.

The bag 12 also includes at least one grommet 52, which provides a conventional quick disconnect compressed air hose fitting. Additionally, the bag 12 includes a second self-sealing penetration sleeve 54 which further includes a pair of ties or tabs 56 and 58 for attachment to and securing of a vacuum probe (not illustrated) for removal of the loose waste to a conventional filter system (also not illustrated).

The bottom of the bag 12 includes an access zipper 60 along the length thereof, which can be opened as desired by manipulating a zipper pull 62. Additionally, if desired, the bag 12 can include a removable bottom protective panel 64, which can be placed in the bottom of the bag to prevent penetration of the bag 12 when a tool or brake is dropped thereon. The panel 64 also can be formed from a substantially rigid PVC material.

The system 10 can be suspended for work on a brake assembly by a pair of adjustable straps 66 and 68. The straps 66 and 68 can include various fastening means 70 and 72 on the ends thereof, such as hooks, Velcro loops and hooks or snap connect assemblies in various configurations. The straps 66 and 68 can be utilized to support the system 10 from a variety of support structures, such as overhead cranes or hydraulic lifts.

Additionally, the system 10 can be suspended from a magnetic plate 74, which preferably is attached to an automobile 76 as illustrated in FIGS. 4 and 5. The plate 74, preferably is a flexible magnetic plate such as formed from magnetic impregnated polymer or PVC material.

The plate 74 then is attached directly to a fender 78 of the automobile 76. The system 10, which only weighs about three to four pounds, is mounted over a brake assembly 80 of the automobile 76 and then hung by the straps 66 and 68 and hooks 70 and 72 from the plate 74. The various hoses or probes then can be inserted into the bag 12, such as a compressed air hose 82 in the grommet 52 and a vaccum line or second air hose probe 84 into the sleeve 46. A main vaccum line probe 86 would be inserted and secured into the sleeve 54.

If desired, or for utilization on automobiles with fiberglass fenders, the system 10 also can be suspended from other locations as described above. Also, low pressure mechanical clamping means (not illustrated) could be utilized on the edge of the wheel well of the fenders 78 to provide support for the system 10.

The system 10 also can be suspended from a second magnetic panel 88, as illustrated in FIG. 5. The panel 88 is of a sufficient length to suspend the system 10 with the straps 66 and 68 substantially vertical to provide additional stability to the system 10. The plate 74, the panel 88 and the clamps (not illustrated) also can be utilized in combination with a low tack/high tack gripping tape on the contact surface thereof to ensure that the plate 74, the panel 88 and the clamp will not slide or be otherwise dislodged until the worker has completed the job. Once the job is completed, the worker removes the system 10 for storage and reuse, or disposal if appropriate.

The improvements of the present invention now will be discussed with reference to FIGS. 6–8.

In FIGS. 6–8, an improved glove bag waste removal system of the invention is designated generally by the reference numeral 100. The system 100 also easily is movable to any desired location, A glove bag 102 is provided similar in construction to the bag 12 depicted in FIGS. 1, 2 and 4 and all common reference numerals refer to the same parts a those previously described.

The improvement of the present invention resides in the apparatus for supporting the bag 102 from a support surface located underneath the bag 102, for sealingly inserting the bag 102 over a brake drum, in an alternate embodiment, depicted in FIG. 8, in which a pair of glove sleeves are located in one end of an alternate bag, and where the bag is shaped to provide easy access to the brake assembly work area.

Referring now to FIG. 6, the improved system 100 includes the glove bag 102, a cradle 104 and a telescoping or otherwise adjustable support pole 106. The cradle 104 includes a pair of arcuate arms 108 and a depending pole socket 110 dimensioned to frictionally or threadingly engage or accept an upper end 112 of the support pole 106. The ends of the arms 108 are fastened to the lower stiffening tubes 20 and 26 (the latter tube best illustrated in FIG. 1) by rivets or other conventional fasteners.

The support pole 106 preferably is manufactured of aluminum, rigid plastic, or similar lightweight material and has an upper pole member 114 which slidingly and telescopingly engages in a lower pole member 116. The socket 110 can include slots (not illustrated) to prevent rotation of the support pole 106, or the cradle 104 can be formed from channel shaped members, with the top of the pole 106 sliding over the socket 110 and shaped to fit into the channel to prevent rotation. An annular collar 118 includes an adjustable locking member, such as a locking nut 120 or similar locking device. The member 120 releasably secures the upper member 114 relative to the lower member 116 to adjust the height of the pole 106, and the bag 102 mounted thereon, to correspond to the height of the suspended brake assembly 80. A lower end 122 of the pole 106 has a T-cross bar foot 124 mounted perpendicular to the vertical pole 106. The ends of the foot 124 can be provided with rubber or plastic caps 126 secured thereon by adhesive or friction for increased adhesion to a floor or other surface. The bag 102 then is free to pivot or move back and forth on the pivot point provided by the foot 124, so the bag 102 can be placed over the brake assembly. At the same time, the foot 124 provides lateral stability.

In operation, with the bag 102 inserted over the brake assembly 80 as shown in FIG. 6 and as described previously, the support pole 106, provides support for the bag 102 from underneath, while still allowing the positioning of the system 100 to be adjusted at the discretion of the user. Left unattended, the system 100 will remain standing, supported by the pole 106 and retained on the brake assembly by a flexible membrane control opening ISO illustrated best in FIG. 7 and described hereinafter. In addition, the system 100 could also be supported by the magnetic panels 74 or 88 illustrated in FIGS. 1, 4 and 5.

Referring now to FIG. 7, the system of the invention 100 includes an improved flexible membrane control opening 130. The opening 130 has at least one and preferably two flexible membranes 132 and 134 fabricated of generally circular sheets of rubber latex or similar material. The membranes 132 and 134, for example, can be formed from rubber latex with a thickness on the order of 0.040 inches. FIG. 7 depicts the two membranes 132 and 134 in back-to-back orientation. Each membrane 132, 134 has a single slit 136 extending generally diametrically therethrough with an expansion aperture 138 located at each end thereof. The expansion apertures 138 help prevent the membranes 132 and 134 from tearing. The slits1136 act as button holes to secure the system of the invention 100 to the brake assembly 80 as illustrated in FIG. 6.

The membranes 132 and 134 are arranged on a disc frame 140 in back-to-back fashion so that the slits 136 cross each other at an angle to provide a more efficient seal over the brake assembly 80. A third membrane, not illustrated, could be added if desired to ensure the opening 130 does not leak. The frame 140 is fabricated of PVC or similar selfsupporting material to which the membranes 132 and 134 are sewn or secured by other conventional fasteners. The frame 140 also is releasably fastened to the rigid ring 16 or to the bag 102 (not shown) by means of a ZIP-LOCK ® type plastic zipper 142 or similar releasable fastener to allow replacement of torn or worn membranes 132 and 134. The pole 106 and the foot 124 allow the bag 102 essentially to float over the brake assembly 80, secured from forward movement by the membrane 130.

The bag 102 preferably is shaped or tapered from a small end plate 40 to a larger diameter membrane 130. The shape allows the user easily to reach around the bag 102 and reach the brake assembly 80 work area with the glove sleeves 36 and 38.

Referring now to FIG. 8, an alternate embodiment of the bag 102 is generally designated by the reference numeral 144. The bag 144 is similar to the bags 12 and 102, and all common reference numerals refer to the same parts.

The bag 144, in contrast to the bags 102 and 12, includes a pair of glove sleeves 146 and 148 each located in an end 150 of the bag 144 opposite the membrane opening 130. This alternate glove bag location can afford greater accessability to the brake assembly 80 work area in certain types of vehicles and by users of certain physical builds. In order to accommodate both glove sleeves 146 and 148 in spaced relationship, the generally circular ring 14 is replaced by an oval ring 152. This allows the user space to work through the end 150 of the glove bag 144. The bag 144 is illustrated tapered opposite to the bag 102, with the end 150 being largest, allowing the user room on the inside of the bag 144 to work in a lateral direction, but also having a height short enough to see or lean over. The bag 144 or the bag 102 also can have straight sides. Further, the bag 144 can have the end 150 smaller than the membrane end 130 to accommodate the brake assembly 80.

Many modifications and variations of the present invention are possible in light of the above teachings. Clearly the size, shape and spacing of the bag and openings therein can be varied depending upon the application. Also, although four stiffening rods or ribs are disclosed, more or less rods could be utilized. The sleeves 46 and 54 and the grommet 52 also can be utilized to place tools, such as a screw driver, into the bag 12. The removable and replaceable glove portions are important, since the system 10 generally is reusable. It is therefore, to be understood that within the scope of the appended claims, the invention may be practiced otherwise than as specifically described.

What is claimed and desired to be secured by Letters Patent of the United States is:

1. An improved glove bag waste removal system for asbestos impregnated brakes, comprising:
   a containment bag having at least one glove sleeve means therein and replaceable flexible opening means for mounting said bag over a brake assembly, said opening means including a pair of flexible sealing membrane means abutting one another, each having a cross slit therein, said cross slits oriented at an acute angle to one another to form a button/buttonhole like assembly for inserting over the brake assembly; and
   means for supporting said bag from a floor or other support surface located below said bag.

2. The system as defined in claim 1 wherein said membrane frame is provided with means to releasably fasten said frame to said bag in sealing fashion.

3. The system as defined in claim 2 wherein said fastening means includes a zipper type fastener.

4. The system as defined in claim 1 wherein said bag includes a pair of substantially rigid end rings secured thereto to form a body with a substantially cylindrical shape with a front end and a rear end, a plurality of removable stiffening means inserted between said rings and secured to said body to form said cylindrical shape and said flexible opening means being in the rear end thereof.

5. The system as defined in claim 4 wherein said bag is provided with means for supporting said bag for mounting upon a brake assembly, including a telescoping pole having an upper end designed to releasably engage said bag and a lower T-shaped cross bar end adapted to contact said floor.

6. The system as defined in claim 5 wherein said bag includes a pole receiving receptacle to engage said pole fixed by a cradle to said stiffening means.

7. The system as defined in claim 4 wherein said front end of said body is provided with at least one glove sleeve means therein.

8. The system as defined in claim 7 wherein said front end of said body is provided with a pair of glove sleeve means therein.

9. The system as defined in claim 8 wherein said front end of said body is oval shaped and said body is tapered from a first dimensioned front end to a second dimensioned rear end thereof.

10. The system as defined in claim 4 wherein said body is provided with at least one glove sleeve means in at least one side of said cylindrical body and said body is tapered from a first dimensioned front end thereof to a larger dimensioned rear end thereof.

11. An improved glove bag waste removal system for asbestos impregnated brakes, comprising:
a containment bag having at least one glove sleeve means therein, said bag including a pair of substantially rigid end rings secured thereto to form a body with a substantially cylindrical shape with a front end and a rear end, a plurality of stiffening means between said rings and secured to said body to form said cylindrical shape and flexible opening means for mounting said bag over a brake assembly, said flexible opening means being in the rear end of said bag and said opening means including a pair of flexible sealing membrane means abutting one another, each having a cross slit therein, said cross slits oriented at an acute angle to one another to form a button/buttonhole like assembly for inserting over the brake assembly mounted to a frame; and
means for supporting said bag from a floor or other support surface located below said bag.

12. The system as defined in claim 11 wherein said membrane frame is provided with means to releasably fasten said frame to said bag in sealing fashion to provide replaceable flexible opening means.

13. The system as defined in claim 12 wherein said fastening means includes a zipper type fastener.

14. The system as defined in claim 11 wherein said bag is provided with means for supporting said bag for mounting upon a brake assembly, said bag including a pole receiving receptacle fixed by a cradle to said stiffening means including a telescoping pole having an upper end designed to releasably engage said bag receptacle and a lower T-shaped cross bar end adapted to contact said floor.

15. The system as defined in claim 11 wherein said front end of said body is provided with a pair of glove sleeve means therein and said front end of said body is oval shaped and said body is tapered from a first dimensioned front end to a second dimensioned rear end thereof.

16. The system as defined in claim 11 wherein said body is provided with at least one glove sleeve means in at least one side of said cylindrical body and said body is tapered from a first dimensioned front end thereof to a larger dimensioned rear end thereof.

17. The system as defined in claim 11 wherein said stiffening means are removable and are insertable between said rings.

18. An improved glove bag waste removal system for asbestos impregnated brakes, comprising:
a containment bag having at least one glove sleeve means therein and replaceable flexible opening means for mounting said bag over a brake assembly, said bag including a pair of substantially rigid end rings secured thereto to form a body with a substantially cylindrical shape with a front end and a rear end, a plurality of removable stiffening means inserted between said rings and secured to said body to form said cylindrical shape and said flexible opening means being in the rear end thereof; and
means for supporting said bag from a floor or other support surface located below said bag including means for supporting said bag for mounting upon a brake assembly, including a telescoping pole having an upper end designed to releasably engage said bag and a lower T-shaped cross bar end adapted to contact said floor and said bag including a pole receiving receptacle to engage said pole fixed by a cradle to said stiffening means.

19. An improved glove bag waste removal system for asbestos impregnated brakes, comprising:
a containment bag having at least one glove sleeve means therein and replaceable flexible opening means for mounting said bag over a brake assembly, said bag including a pair of substantially rigid end rings secured thereto to form a body with a substantially cylindrical shape with a front end and a rear end, a plurality of removable stiffening means inserted between said rings and secured to said body to form said cylindrical shape and said flexible opening means being in the rear end thereof, said front end of said body is provided with a pair of glove sleeve means therein, said body is oval shaped and said body is tapered from a first dimensioned front end to a second dimensioned rear end thereof; and
means for supporting said bag from a floor or other support surface located below said bag.

20. An improved glove bag waste removal system for asbestos impregnated brakes, comprising:
a containment bag having at least one glove sleeve means therein, said bag including a pair of substantially rigid end rings secured thereto to form a body with a substantially cylindrical shape with a front end and a rear end, a plurality of stiffening means between said rings and secured to said body to form said cylindrical shape and flexible opening means for mounting said bag over a brake assembly, said flexible opening means being in the rear end of said bag and said opening means including at least one flexible membrane with an elongate slit therein mounted to a frame, said bag is provided with means for supporting said bag for mounting upon a brake assembly, said bag including a pole receiving receptacle fixed by a cradle to said stiffening means including a telescoping pole having an upper end designed to releasably engage said bag receptacle and a lower T-shaped cross bar end adapted to contact said floor; and
means for supporting said bag from a floor or other support surface located below said bag.

21. An improved glove bag waste removal system for asbestos impregnated brakes, comprising:
a containment bag having at least one glove sleeve means therein, said bag including a pair of substantially rigid end rings secured thereto to form a body with a substantially cylindrical shape with a front end and a rear end, a plurality of stiffening means between said rings and secured to said body to form said cylindrical shape and flexible opening means for mounting said bag over a brake assembly, said flexible opening means being in the rear end of said bag and said opening means including at least one flexible membrane with an elongate slit therein mounted to a frame and said front end of said body is provided with a pair of glove sleeve means therein and said front end of said body is oval shaped and said body is tapered from a first dimensioned front end to a second dimensioned rear end thereof; and means for supporting said bag from a floor or other support surface located below said bag.

* * * * *